(12) United States Patent
Coudert et al.

(10) Patent No.: US 10,753,215 B2
(45) Date of Patent: Aug. 25, 2020

(54) TURBINE VANE COMPRISING A BLADE WITH A TUB INCLUDING A CURVED PRESSURE SIDE IN A BLADE APEX REGION

(71) Applicant: SAFRAN AIRCRAFT ENGINES, Paris (FR)

(72) Inventors: Laurent Patrick Robert Coudert, Nandy (FR); Erwan Daniel Botrel, Alfortville (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 57 days.

(21) Appl. No.: 15/775,034

(22) PCT Filed: Nov. 14, 2016

(86) PCT No.: PCT/FR2016/052945
§ 371 (c)(1),
(2) Date: May 10, 2018

(87) PCT Pub. No.: WO2017/085387
PCT Pub. Date: May 26, 2017

(65) Prior Publication Data
US 2018/0371925 A1  Dec. 27, 2018

(30) Foreign Application Priority Data
Nov. 16, 2015 (FR) ..................... 15 60998

(51) Int. Cl.
*F01D 5/18* (2006.01)
*F01D 9/04* (2006.01)
*F01D 5/20* (2006.01)

(52) U.S. Cl.
CPC .............. *F01D 9/041* (2013.01); *F01D 5/20* (2013.01); *F05D 2200/10* (2013.01);
(Continued)

(58) Field of Classification Search
CPC ... F01D 5/18; F01D 5/20; F01D 5/186; F01D 5/187; F01D 9/041; F05D 2240/125
See application file for complete search history.

(56) References Cited

U.S. PATENT DOCUMENTS

| 5,192,192 A * | 3/1993 | Ourhaan | ................... | F01D 5/18 |
| | | | | 415/115 |
| 6,672,829 B1 * | 1/2004 | Cherry | .................... | F01D 5/141 |
| | | | | 415/115 |

(Continued)

FOREIGN PATENT DOCUMENTS

| EP | 1 541 806 A2 | 6/2005 |
| EP | 1 726 783 A1 | 11/2006 |

(Continued)

OTHER PUBLICATIONS

International Search Report dated Feb. 10, 2017 in PCT/FR2016/052945 filed Nov. 14, 2016.

(Continued)

*Primary Examiner* — Richard A Edgar
*Assistant Examiner* — Maxime M Adjagbe
(74) *Attorney, Agent, or Firm* — Oblon, McClelland, Maier & Neustadt, L.L.P.

(57) ABSTRACT

A turbine vane of a turbine engine such as a turbojet. The vane includes a base supporting a blade that extends in a spanwise direction and ends in an apex. The blade includes a pressure-side wall and a suction-side wall, each ending at an end edge at the apex of the blade. The blade includes, at the apex thereof, a closed wall extending from the pressure-side wall to the suction-side wall so as to define, with the end edges, a tub shape. The pressure-side wall is curved inward so as to deviate from the spanwise direction in the region of the blade apex preceding the tub, between the base and the pressure-side end edge.

8 Claims, 4 Drawing Sheets

(52) U.S. Cl.
CPC .... *F05D 2200/22* (2013.01); *F05D 2220/323* (2013.01); *F05D 2240/125* (2013.01); *Y02T 50/673* (2013.01)

(56) References Cited

U.S. PATENT DOCUMENTS

| | | |
|---|---|---|
| 2004/0013515 A1 | 1/2004 | Cherry et al. |
| 2005/0220627 A1 | 10/2005 | Goodman |
| 2006/0257257 A1 | 11/2006 | Deschamps et al. |
| 2008/0175716 A1 | 7/2008 | Potier |
| 2014/0119920 A1 | 5/2014 | Coull et al. |
| 2014/0119942 A1 | 5/2014 | Lehmann et al. |
| 2014/0322028 A1* | 10/2014 | Grohens ............ F01D 5/141 416/97 R |
| 2015/0078916 A1 | 3/2015 | Bedrosyan et al. |

FOREIGN PATENT DOCUMENTS

| | | |
|---|---|---|
| EP | 1 911 934 A1 | 4/2008 |
| EP | 2 725 194 A1 | 4/2014 |
| EP | 2 851 511 A2 | 3/2015 |
| WO | WO 2013/072610 A1 | 5/2013 |

OTHER PUBLICATIONS

French Preliminary Search Report dated Jul. 15, 2016 in French Application 1560998 filed Nov. 16, 2015.

* cited by examiner

TURBINE VANE COMPRISING A BLADE WITH A TUB INCLUDING A CURVED PRESSURE SIDE IN A BLADE APEX REGION

TECHNICAL FIELD

The invention relates to a vane of a turbomachine type aircraft engine, such as for example a bypass turbojet engine or a bypass turboprop engine.

STATE OF PRIOR ART

In such an engine 1, outside air is taken in an inlet duct 2 to pass through a fan 3 comprising a series of rotating blades before being splitted into a central primary flow and a secondary flow surrounding the primary flow.

The primary flow is then compressed by passing through a first and a second compression stage 4 and 6, before coming into a combustion chamber 7, after which it is expanded by passing through a set of turbines 8 before being discharged rearwardly by generating thrust. As regards the secondary flow, it is propelled directly rearwardly by the fan to generate further thrust.

The expansion in the turbines 8, which enables the compressor 4, 6 and the fan 6 to be driven, occurs at a high temperature because it occurs immediately after combustion. This turbine 8 is thus designed and dimensioned to operate under harsh temperature, pressure and fluid flow rate conditions.

Each turbine includes a succession of stages each including a series of vanes evenly spaced about the driving shaft, the vanes which are subjected to the harshest conditions being those of the first expansion stages, called high pressure stages.

Increased performance requirements result in designing engines operating in increasingly harsh environments, which implies increasing the temperature resistance of the high pressure vanes, and hence to reconsider the cooling thereof.

Such a vane which appears in FIG. 2 by being marked by 11 includes a root P partially represented and carrying a blade 12 extending along a span direction EV substantially radial with respect to its axis of rotation AX. The blade 12 extends from the root P up to the corresponding apex S at its free end, and it includes a pressure-side wall 13 as well as a suction-side wall 14. By skeleton, it is generally intended a median theoretical surface between the pressure-side wall and the suction-side wall, the skeleton being marked as SQ in the example of FIG. 2.

The pressure side 13 and the suction side 14 join on the one hand at the leading edge 16 of the blade which corresponds to its upstream region AM, and on the other hand at its tapered trailing edge 17 which corresponds to its downstream region AV. Upstream and downstream are understood with respect to the flow direction of the fluid surrounding the operating blade.

In the region of the apex S, the blade 11 comprises a closing wall 18, with an orientation substantially normal to the span direction EV, and which extends from the pressure side to the suction side. The pressure-side wall 13 terminates with an edge 19 which projects from the closing wall 18, and likewise, the suction-side wall 14 terminates with an edge 21 which also projects from the closing wall 18, so as to delimit together with this closing wall 18 a tub shape.

When the blade is operating, that is when the engine is operating, the radial functional mechanical play separating the pressure-side and suction side terminal edges, of the engine case induces a leading vortex to the suction-side because of the pressure difference between the pressure side and the suction side. This phenomenon gives rise to a leak flow rate inducing aerodynamical losses, as well as a warming of the vane apex.

This functional mechanical play ensures that the vane end does not contact the case surrounding it, and its actual value depends on the operating regime of the engine which conditions the thermal expansions of the blade and the case.

The purpose of the invention is to provide a vane structure enabling this drawback to be overcome.

DISCLOSURE OF THE INVENTION

The invention relates to a turbine vane of a turbomachine such as a turbofan engine, this vane comprising a root carrying a blade which extends along a span direction terminating with an apex, this blade comprising a pressure-side wall and a suction-side wall each terminating with a terminal edge (27a, 27b, 27c, 28a, 28b, 28c) at the apex of the blade, the blade including at its apex a closing wall extending from the pressure side to the suction side, the terminal edge of the pressure side and the terminal edge of the suction side projecting from this wall for this wall to delimit with these terminal edges a tub shape, characterised in that: the pressure-side wall is curved so as to deviate from the span direction in the region of the blade apex, this region being on the one hand located between the blade root and the tub and on the other hand contiguous to the tub.

With this curvature arrangement of the blade upper segment which is distant from the root and contiguous to the tub, the pressure distribution at the blade apex is modified so as to limit the air flow rate bypassing the blade apex.

The invention also relates to a vane thus defined, wherein the suction-side wall is curved so as to get closer to the span direction in the region of the blade apex preceding the tub.

The invention also relates to a vane thus defined, wherein the terminal edge of the pressure-side wall is oriented in parallel to the span direction.

The invention also relates to a vane thus defined, wherein the terminal edge of the pressure side is also curved to deviate from the span direction.

The invention also relates to a vane thus defined, wherein the terminal edge of the suction-side wall is curved so as to get closer to the span direction.

The invention also relates to a vane thus defined, wherein the terminal edge of the suction-side wall is oriented in parallel to the span direction.

The invention also relates to a vane thus defined, wherein the terminal edge of the suction-side wall is curved so as to deviate from the span direction.

DETAILED DISCLOSURE OF PARTICULAR EMBODIMENTS

Figure 3:
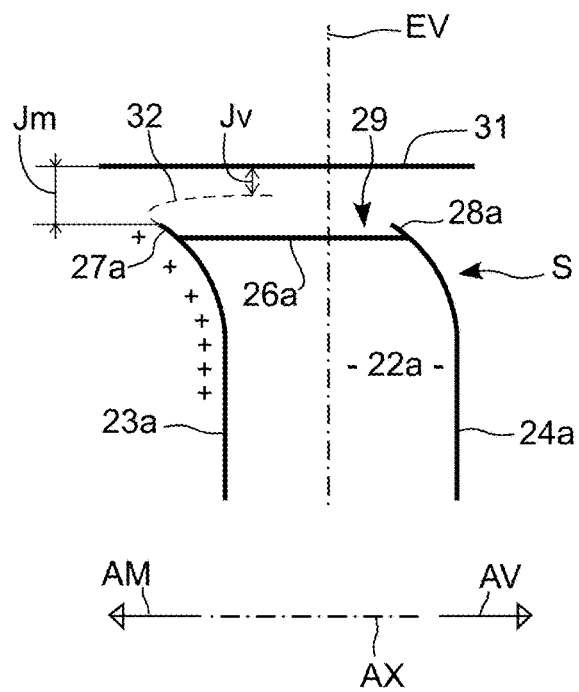
FIG. 3 is a schematic representation of the fluid flow between the case and the apex of a known vane blade in a sectional plane perpendicular to the blade skeleton.

The blade 22*a* according to the invention which is schematically represented in FIG. 3 includes a pressure-side wall 23*a* and a suction-side wall 24*a* joined at its apex S by a closing wall 26*a* with an orientation substantially perpendicular to its span direction EV.

The pressure-side wall terminates at the apex S with a terminal edge 27*a*, and the suction-side wall 24*a* terminates at the apex S with another terminal edge 28*a*. These edges 27*a* and 28*a* project from the closing wall 26*a* to delimit together with this wall a tub 29*a*, at the end of the blade apex S.

As is visible in FIG. 3, both edges 27*a* and 28*a* are spaced apart from the engine case 31 by a distance or functional mechanical play which is noted Jm. This mechanical play Jm ensures that the blade end does not rub against the case when the engine is operating.

According to the invention, the pressure-side wall 23*a* is curved in the apex region preceding the tub 29 so as to deviate from the span axis EV of the blade, instead of remaining at a constant distance from this axis.

This curvature enables the fluid flow to be modified between the blade apex S and the case 31, by getting the current lines closer to the case, that is by deviating them from the closing wall. Under these conditions, the visible play Jv, that is the actual section which is free to let gas pass between the apex S and the case 31 is significantly lower than the mechanical play Jm.

More concretely, the curvature of the pressure-side wall 13 at the blade end enables a high pressure fluid flow boundary layer to be created, which is marked as 32, which extends substantially half-way between the edges 27*a*, 28*a* and the inner face of the case 31. The fluid can only circulate in the reduced space located between this boundary layer 32 and the inner face of the case 31. Between this boundary layer 32 and the closing wall 26*a*, the fluid does not circulate, or very little by forming mainly localised vortices.

Under these conditions, the flow rate of gas which circulates between the end of the blade according to the invention and the case is reduced, because its actual passage section Jv, corresponding to the visible play for the fluid, is low by virtue of the pressure-side curvature which deviates the boundary layer 32 to the inner wall of the case.

In other words, the pressure-side curvature in the region of the blade apex makes bypassing this apex by the fluid more difficult, because this curvature tends to deviate the boundary layer 32 from the blade apex.

Figure 1:
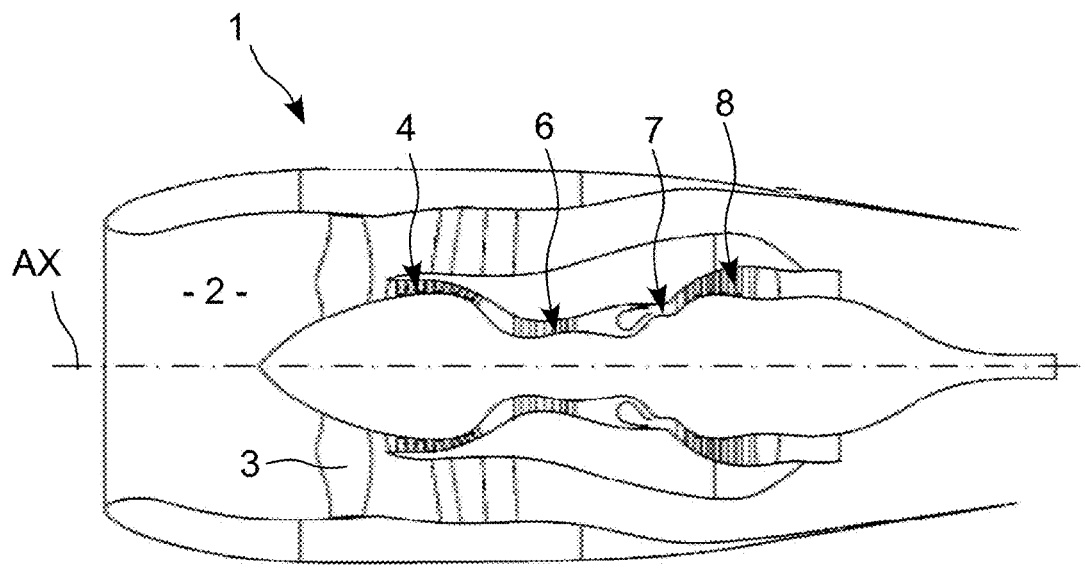
FIG. 1 is a longitudinal cross-section view of a known turbofan engine.
Figure 2:
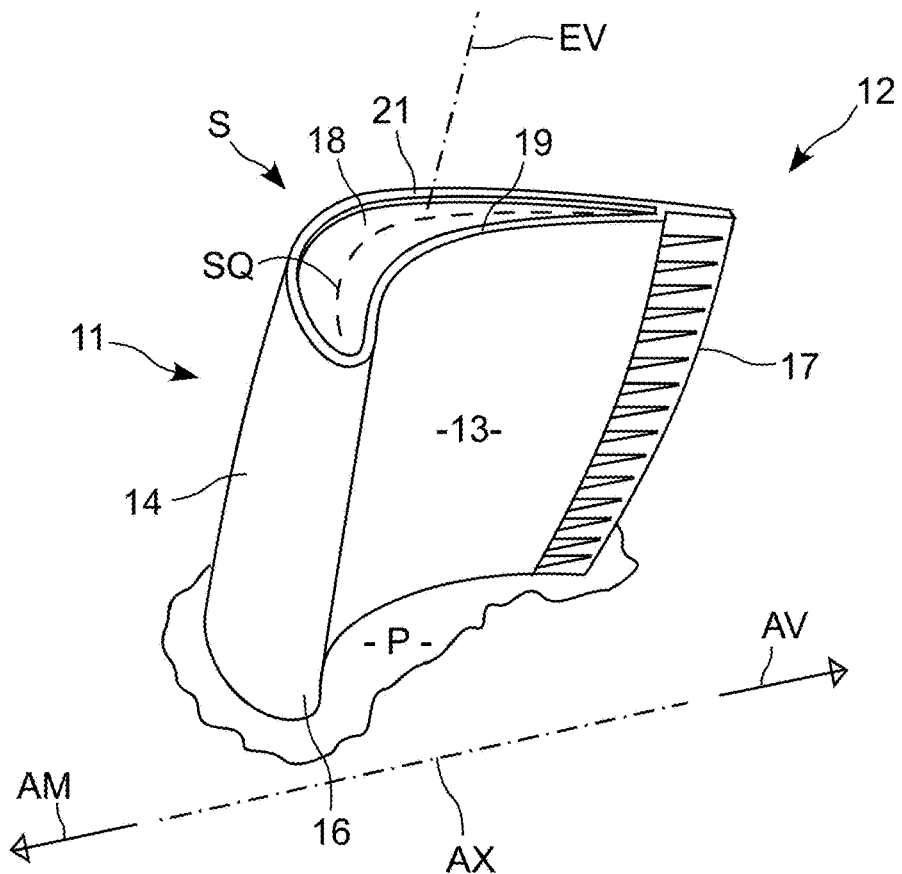
FIG. 2 is a perspective view of a known high pressure turbine vane.
Figure 4:
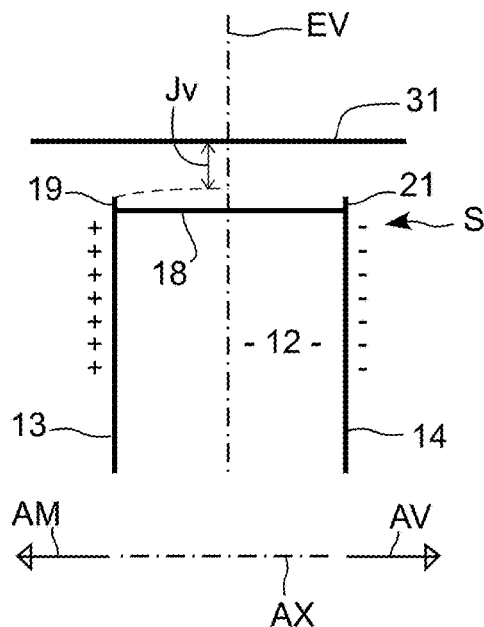
FIG. 4 is a schematic representation of the fluid flow between the case and the apex of a vane blade according to the invention in a sectional plane perpendicular to the blade skeleton.

By way of comparison, FIG. 4 enables the position of the boundary layer and the visible play to be viewed in the case of a known blade of the type of FIG. 2, that is wherein the pressure side is straight instead of being curved. As is visible in FIG. 4, the pressure side parallel to the span direction gives rise to a boundary layer which, unlike the case of the invention, is very close to the closing wall. This boundary layer thus reduces very little the space allowing gas circulation between the blade apex and the inner face of the case, thus inducing a significant leak flow rate.

According to the invention, different geometrical configurations are possible for the blade, as illustrated in the different figures. Thus, in the example of FIG. 3, the pressure-side wall is curved from a region preceding the tub 29 with its closing wall 29 along the span axis, up to the terminal edge 27*a* of this pressure-side wall which extends in the continuity of the rest of the pressure-side wall. The curvature is oriented such that the pressure-side wall deviates from the span axis as the end of the blade apex S gets closer.

In this example of FIG. 3, the suction-side wall 24*a* is also curved, to be substantially equidistant from the pressure-side wall: the suction-side wall 24*a* gets closer to the span axis as the end of the blade apex S gets closer. The suction side 24*a* is also curved from a portion preceding the tub along the span axis EV, to the terminal edge 28*a* which extends from the bent portion of the suction-side wall 24*a*.

The shape of the curvature can advantageously be determined by the relationship below:

$$\Delta(R) = \Delta\max * \frac{(R - R\min)^n}{(R\max - R\min)^n}.$$

In this relationship, Rmax designates the maximum blade radius, that is the distance separating the end of the blade apex from its axis of rotation AX, Rmin designates the blade radius where the pressure-side curvature starts, Rb designates the blade radius at its closing wall 26*a*. Amax designates the desired maximum offset at the end of the blade apex, and n designates the power associated with the offset smoothing.

Figure 5:
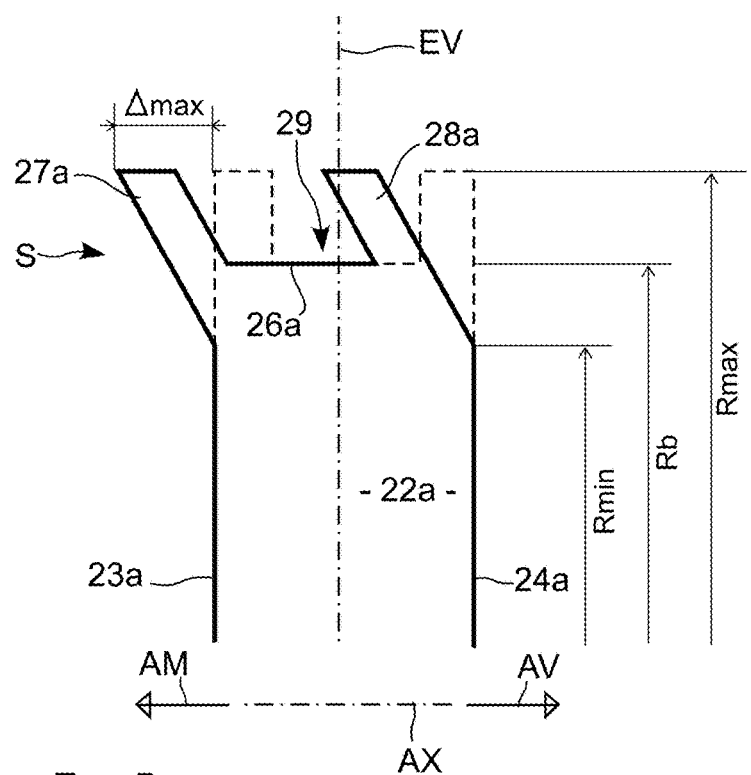
FIG. 5 is a schematic representation of a first embodiment of a vane blade according to the invention viewed along a sectional plane perpendicular to its skeleton.
Figure 7:
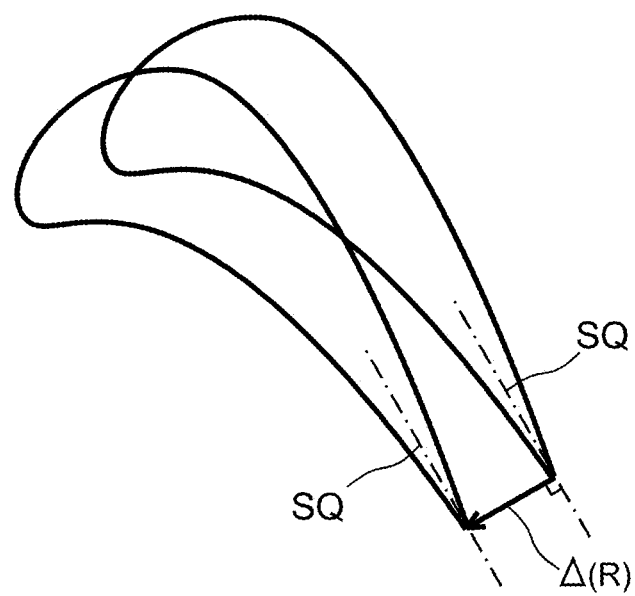
FIG. 7 is a representation of the offset of the pressure side and the suction side in the region of the blade apex.

With this relationship, and as is illustrated in the graph of FIG. 7, the curvature shape of the wall is conditioned by the n value, with the proviso that for n=1, a curved portion which is actually rectilinear or set is obtained, as in FIG. 5. This curved portion takes an increasingly curved shape when n increases, with the proviso that at the very end, when n tends to infinity, the curved portion becomes a planar portion perpendicular to the span axis.

This relationship defining the offset of the sections at the apex with respect to the skeleton of the trailing edge of the movable blade, enables losses due to the play vortex to be reduced.

Figure 6:
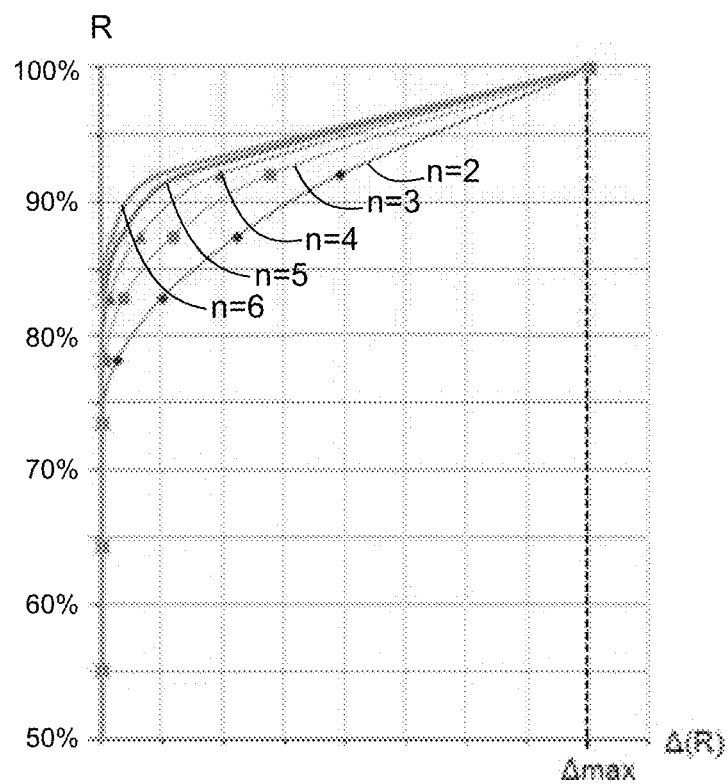
FIG. 6 is a representation of several curvature shapes of the pressure side in the region of the blade apex.

On the other hand, for a given section corresponding to a radius R, the offset $\Delta(R)$ of the profile of the wall is made in perpendicular to the skeleton direction SQ of the blade at its trailing edge, as schematically illustrated in FIG. 6.

As will be understood, the vane shape according to the invention is defined from a vane having a pressure side and a suction side extending in parallel to the span axis. The sections of this vane are then offset by the offset value $\Delta(R)$, along a direction perpendicular to the orientation of the skeleton in the region of the trailing edge.

In the embodiment corresponding to FIGS. 3 and 5, the pressure-side wall 23*a* and the suction-side wall 24*a* are both curved from a portion preceding the tub 29 or the closing wall 26*a*, up to their end edges 27*a*, 28*a*. The edges are thus oriented to extend from the pressure-side wall and the suction-side wall respectively.

Generally, the curved portion of the pressure-side and suction-side walls extends over a blade height that can be between five and thirty percent of the total blade height, the curvature being located in the region of the blade apex. The rest of the pressure-side or suction-side wall is on the contrary straight, that is parallel to the axis EV.

It is also possible to give to the terminal edges of the pressure side and suction side different inclinations or curvatures from those of the pressure-side wall and the succion-side wall in the region preceding the tub.

Figure 8:
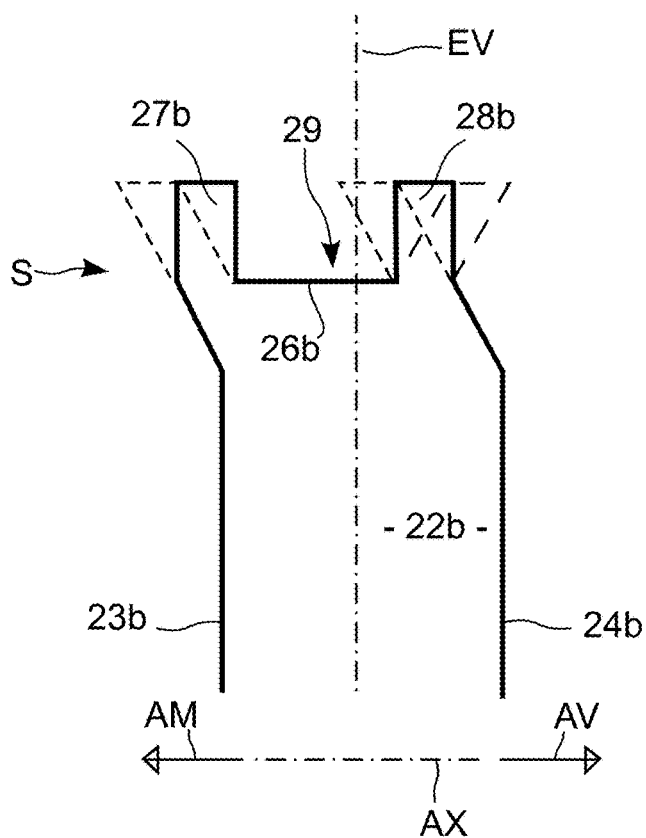
FIG. 8 is a schematic representation of a second embodiment of the vane blade according to the invention viewed along a sectional plane perpendicular to its skeleton.

This is the case in the second embodiment of the invention illustrated in FIG. 8, wherein the blade 22b includes a pressure-side wall which is curved to deviate from the span axis in the region preceding the tub delimited by the closing wall 26b along the axis EV. But in this second embodiment, the terminal edge 27b of the pressure-side wall 23b is straight, that is it extends in parallel to the span direction EV.

In the same way, in this second embodiment, the suction-side wall 24b is also curved on a portion preceding the closing wall 26b by getting closer to the axis EV, but the edge 28b of this suction-side wall 24b is in turn straight, that is parallel to the axis EV.

It is still possible, alternatively, to provide that the edge 28b of the suction side 24b with a curvature reverse from the curvature of the suction-side wall in the region preceding the tub. In this case, the suction-side wall 24b gets closer to the axis EV in the region preceding the tub, and it deviates from this axis EV at its terminal edge. This arrangement enables among other things the tub to be widened in order to have greater efficiency.

Figure 9:
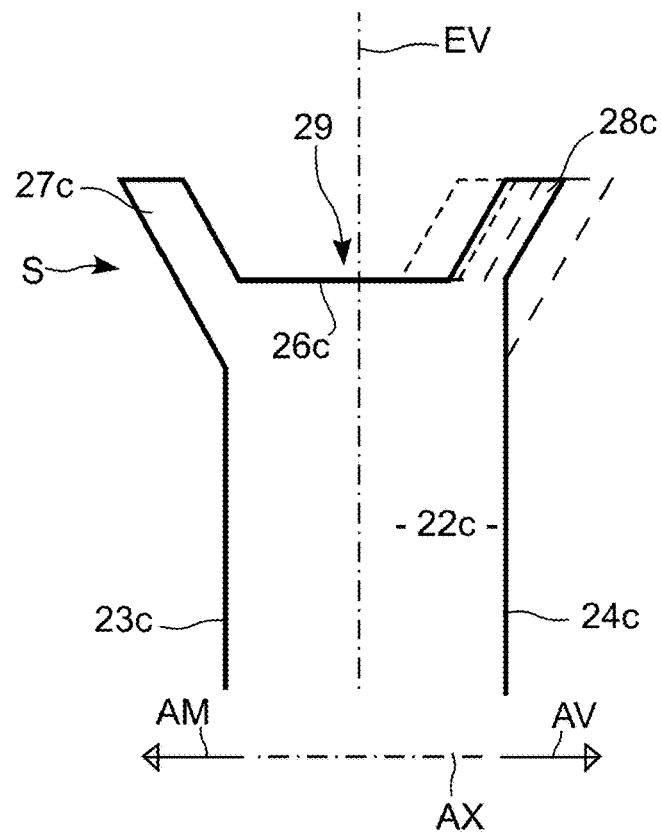
FIG. 9 is a schematic representation of a third embodiment of the vane blade according to the invention viewed along a sectional plane perpendicular to its skeleton.

In the third embodiment illustrated in FIG. 9, and which also aims at widening the tub, the blade 22c comprises a pressure-side wall 23c of the same type as that of the first embodiment corresponding to FIGS. 3 and 5, that is curved to deviate from the axis EV, from a portion preceding the tub 29 up to its edge 27c which is curved in the same direction.

But in this third embodiment, the suction-side edge 24c is in turn straight including in the entire portion preceding the tub, and its terminal edge 28c, which contributes to delimiting the tub, is also curved to deviate from the axis EV, which gives to the tub a flared shape widening towards the blade end.

Alternatively, it is also possible to provide that the suction-side wall 24c is curved to deviate from the span axis EV in the portion preceding the tub by being extended by its terminal edge which also deviates from the span axis. This alternative gives to the blade apex a flared shape providing the tub with a width higher than that of the second embodiment.

As is understood, the invention enables the direction of the pressure-side edge to be differently adapted from that of the suction-side edge with respect to the reference direction which is the shape of the corresponding wall under the tub region.

Generally, the invention enables leaks to be reduced at the blade apex without having to add material, thus mass, to the blade, which increases the turbine efficiency. The robustness of the turbine performance during the engine life is increased too.

The design flexibility brought about by the invention is summarised as a local modification which can be applied when the blades of an existing engine have to be removed.

The invention not only allows aerodynamic compensation but further does not oppose to curvature retrofits of the vane walls relating to a mechanical compensation offset. Advantageously, the aerodynamical compensation according to the invention is compatible with offsets of mechanical compensations, these offsets being for minimising stresses in the vane upon rotating.

The invention claimed is:

1. A turbine vane of a turbomachine, the turbine vane comprising:
a root carrying a blade which extends along a span direction terminating with a blade apex, said blade comprising a pressure-side wall and a suction-side wall each terminating with a terminal edge at the blade apex, the blade including at the blade apex a closing wall extending from the pressure-side wall to the suction-side wall, the terminal edge of the pressure-side wall and the terminal edge of the suction-side wall projecting from the closing wall to delimit with the terminal edges of the pressure-side wall and the suction-side wall a tub shape,
wherein the pressure-side wall is curved so as to deviate from the span direction in a region of the blade apex, from a region located between the blade root and the tub, the pressure-side wall having a curvature determined by a relationship:

$$\Delta(R) = \Delta\max * \frac{(R - R\min)^n}{(R\max - R\min)^n}$$

wherein:
$\Delta(R)$ designates an offset value of the pressure-side wall, for a section located at a radius R from an axis of rotation of the blade;
Rmax designates a maximum radius of the blade from an end of the blade apex to the axis of rotation;
Rmin designates a radius of the blade where the curvature of the pressure-side wall starts;
$\Delta$max designates a maximum offset at the end of the blade apex; and
n designates a smoothing power between 2 and 6.

2. The vane according to claim 1, wherein the terminal edge of the suction-side wall is curved towards the span direction.

3. The vane according to claim 1, wherein the suction-side wall is curved towards the span direction in the region of the blade apex preceding the tub.

4. The vane according to claim 1, wherein the terminal edge of the pressure-side wall is curved away from the span direction.

5. The vane according to claim 1, wherein the terminal edge of the suction-side wall is oriented in parallel to the span direction.

6. The vane according to claim 1, wherein the terminal edge of the suction-side wall is curved away from the span direction.

7. A turbine of a turbomachine comprising the vane according to claim 1.

8. A turbomachine comprising the turbine according to claim 7.

* * * * *